G. A. WENDT.
WATER MOTOR.
APPLICATION FILED JUNE 23, 1915.
1,211,650.
Patented Jan. 9, 1917.
3 SHEETS—SHEET 1.
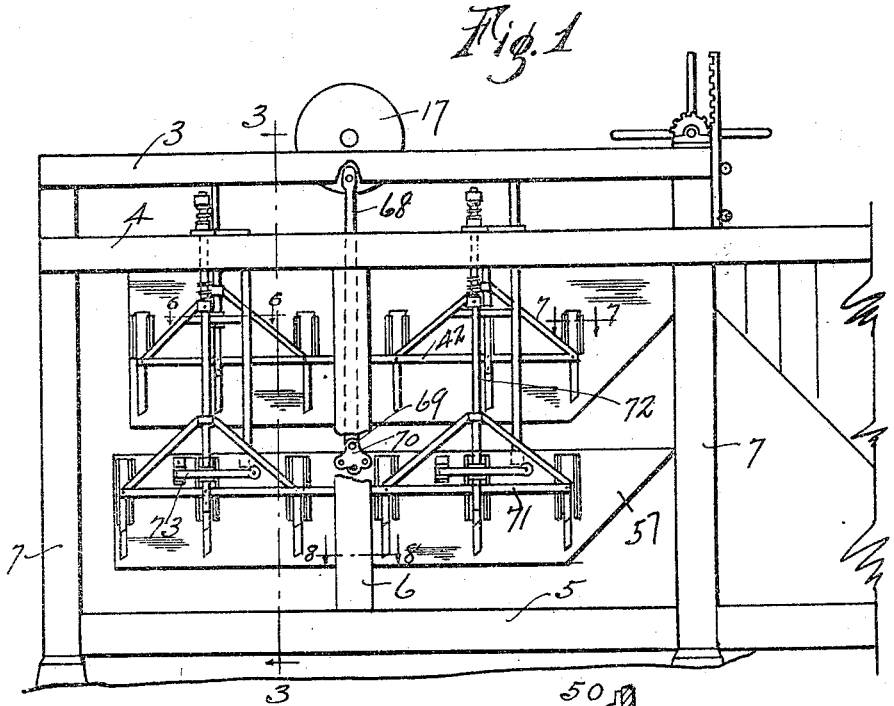
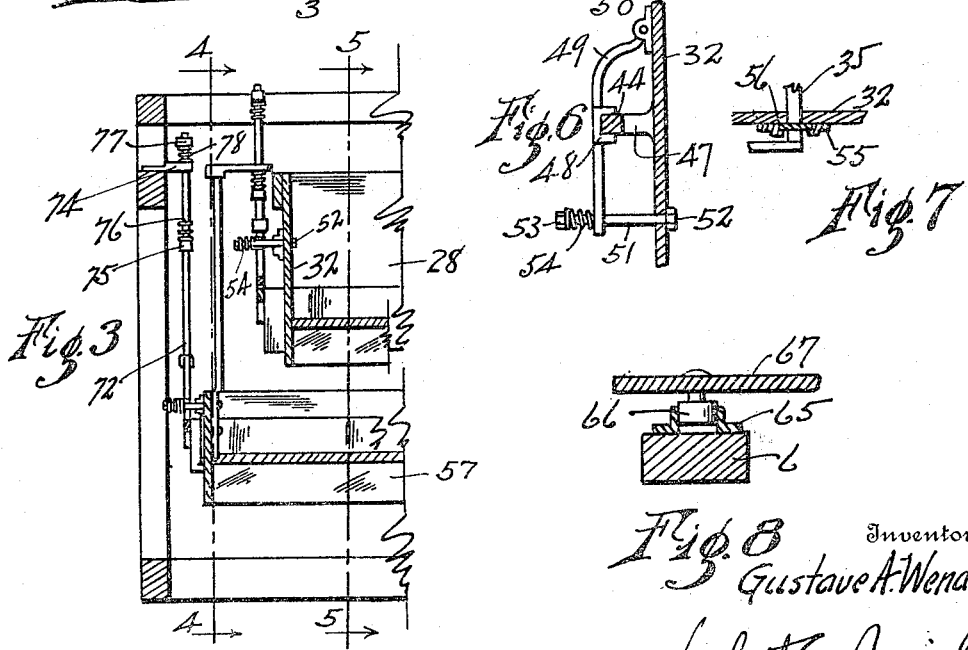
Inventor
Gustave A. Wendt.
By Herbert E. Smith
Attorney

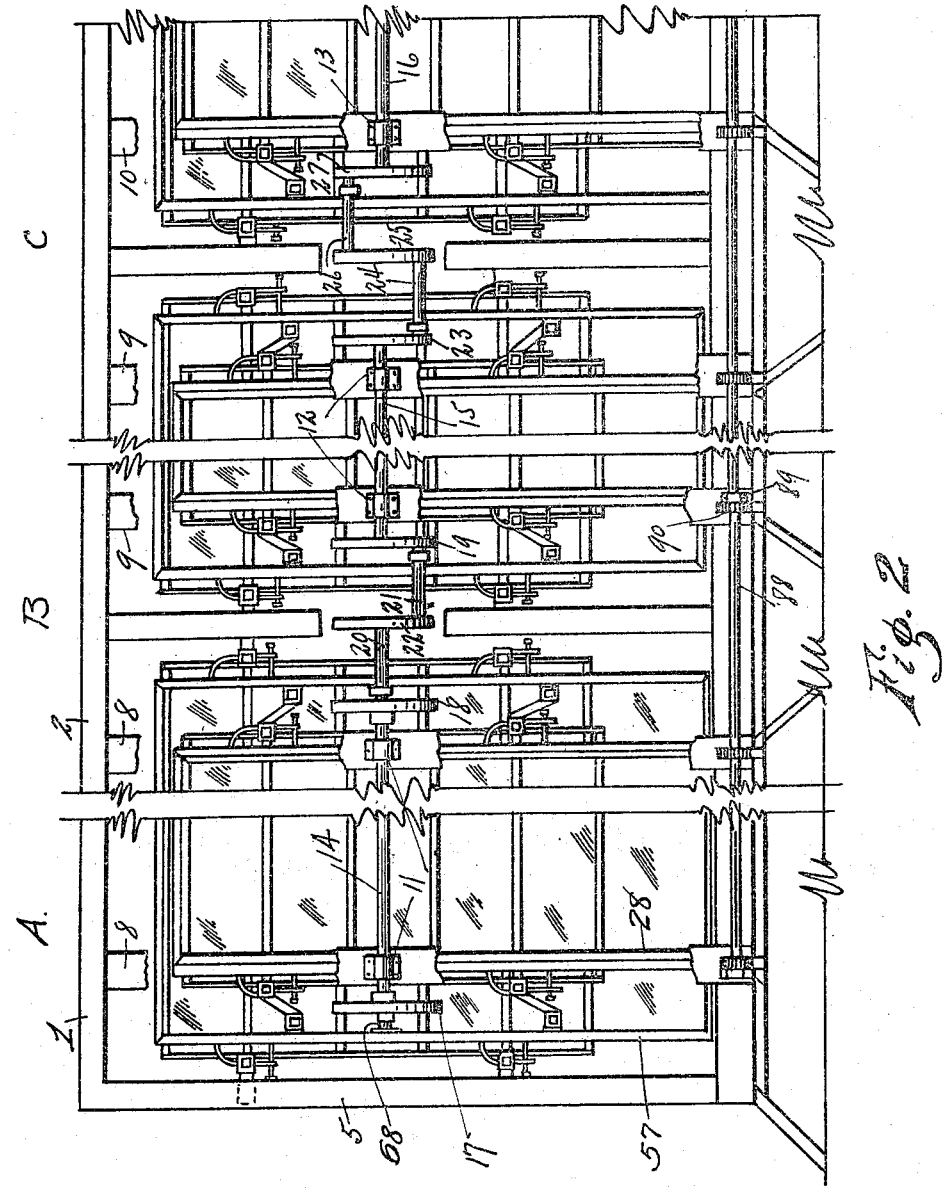

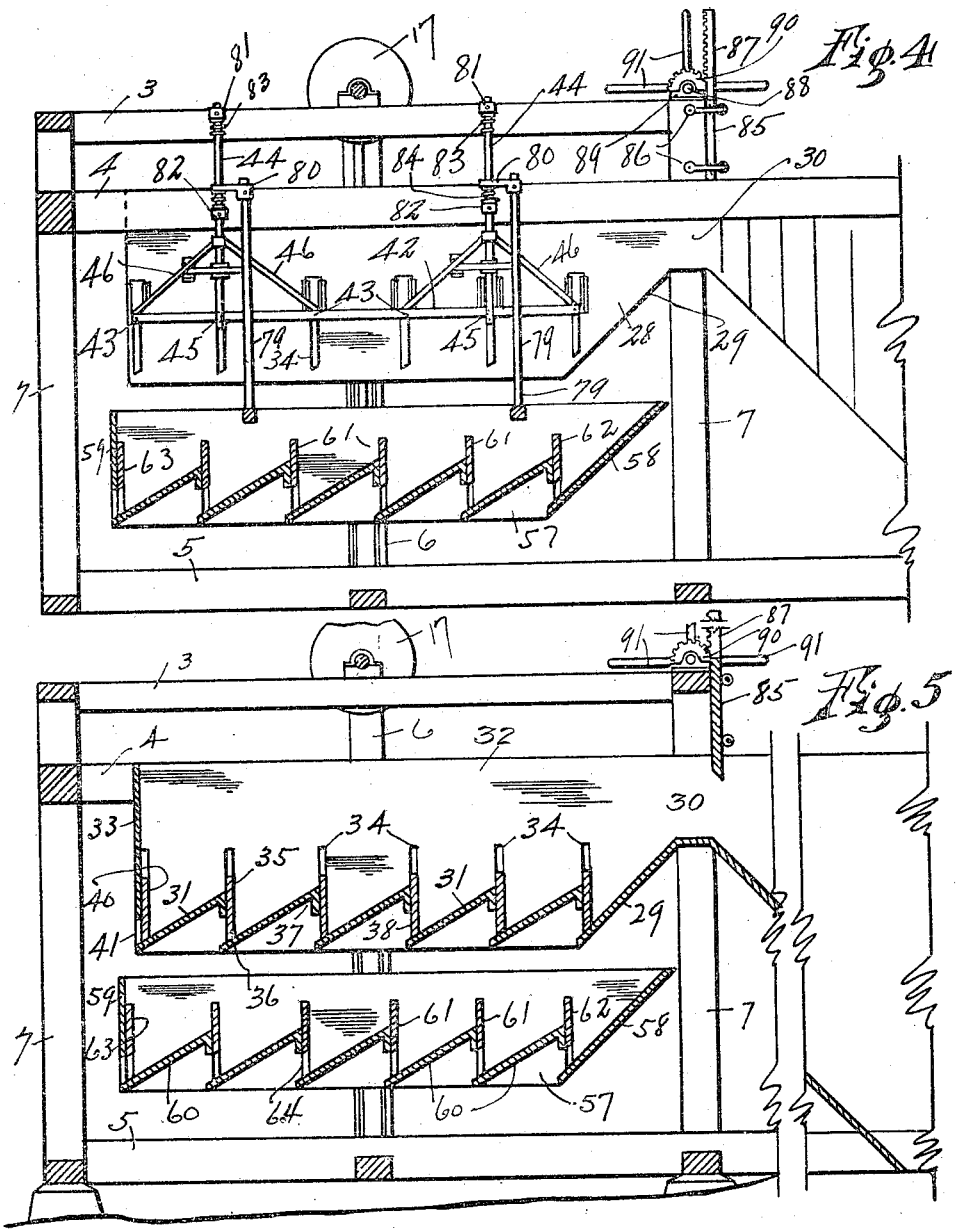

UNITED STATES PATENT OFFICE.

GUSTAVE A. WENDT, OF SPOKANE, WASHINGTON.

WATER-MOTOR.

1,211,650.        Specification of Letters Patent.        Patented Jan. 9, 1917.

Application filed June 23, 1915. Serial No. 35,797.

*To all whom it may concern:*

Be it known that I, GUSTAVE A. WENDT, citizen of the United States, residing at Spokane, in the county of Spokane and State of Washington, have invented certain new and useful Improvements in Water-Motors, of which the following is a specification.

This invention relates to improvements in water motors.

The invention includes a supply bucket, which is preferably stationary, and a motor bucket adapted to move into and out of receiving relation with the supply bucket, the said buckets being preferably shaped to nest when in transfer relation as regards the water flowing from the supply to the motor bucket.

Each bucket is provided with valve controlled discharge means which is preferably in the form of a series of gates for each bucket, the gates or structures being arranged to intermesh to provide for nesting relation of the motor bucket with the supply bucket when the former is in receiving relation with respect to the latter.

A further object of the invention is to provide valve operating means whereby discharge from the buckets is so controlled that the valves of the supply bucket will be opened when the motor bucket is in receiving relation with respect thereto, the valves of the motor bucket being closed during such relation, and opened at the time the contents of the motor bucket is to be discharged, the foregoing mechanism being entirely automatic, in the most improved embodiment of the invention.

A further object of the invention is to arrange the motor buckets and their supply buckets in batteries, with the motor buckets suitably connected so as to provide for the taking off of a substantially continuous or sustained power thrust.

Further objects and features of the invention will be more fully described in connection with the accompanying drawings and will be more particularly pointed in and by the appended claims.

In the drawings: Figure 1 is a view in side elevation of one unit of a battery of motors, Fig. 2 is a plan view showing two complete units and a fragment of a third unit, forming a battery, Fig. 3 is a sectional view on line 3—3 of Fig. 1, Fig. 4 is a sectional view on line 4—4 of Fig. 3, Fig. 5 is a sectional view on line 5—5 of Fig. 3, Fig. 6 is a sectional view on line 6—6 of Fig. 1, Fig. 7 is a sectional view on line 7—7 of Fig. 1, Fig. 8 is a sectional view on line 8—8 of Fig. 1.

Like characters of reference designate similar parts throughout the different figures of the drawings.

As illustrated, I have shown a battery of motors comprising units A, B and C. A suitable frame work, generally indicated at 1, and comprising longitudinal members 2, transverse members 3, 4 and 5 and vertical or upright members 6 and 7, it being understood that the frame work itself is not an important feature of the invention and may be of any desired form. On upper transverse frame members 8, 9 and 10, I mount bearings 11, 12 and 13 in which crank shafts 14, 15 and 16, are journaled. Shaft 14 is provided with a crank disk 17, on one end thereof, and on the other end thereof said shaft 14 is provided with a crank disk 18. Shaft 15 is provided with a crank disk 19 and crank rods 20 and 21, offset with respect to each other at quarters or thirds, as desired, are connected with an intermediate crank disk 22, and with disks 18 and 19. The same arrangement designated at 23, 24, 25, 26 and 27 is provided for the adjacent ends of shafts 15 and 16, of units B and C. Power may be taken off from the foregoing connected shafting in any desirable manner, not shown but the units are so connected that all will impart a driving thrust to the shafting just described so as to afford a substantially sustained operation of the latter.

Owing to the fact that the construction and operation of all of the units are identical, only one unit need be described in detail, reference being had more particularly to the remaining figures of the drawings.

The upper or supply bucket is designated at 28 and may be secured in a stationary manner to the frame work as desired. one wall 29, of the bucket, being inclined toward a supply inlet 30. The supply bucket 28 is provided with a bottom wall formed of a series of gate coacting sections 31 arranged to function with gates 35 as gate seats, in connection with the lateral or side walls 32. An end wall 33 is indicated in Fig. 5. The side walls 32 are provided with gate guides which may be in the form of slots 34 of a length sufficiently in excess of one dimension of the gate therefor to permit of vertical movement of the gate into opening and closing positions. The gate seats 31 are shown inclined with respect to the horizontal and the gates 35 are guided in the slots 34 to be disposed vertically or substantially so, the gates being at an oblique angle to the gate seat sections 31. It will now be clear by reference to Fig. 5 that one margin 36, of section 31, forms a valve seat for one of the gate valves 35, and that the other end 37 coacts with the next adjacent gate 35 to support the same under water pressure and to define, with the companion or adjacent section 31, the area of one discharge outlet 38, it being understood that the foregoing singular arrangement is duplicated, in plural, throughout the series of gates excepting the endmost gates 39 and 40. Gate 40 moves abreast of end wall 33 and seats upon one endmost section 31. Gate 39 coacts with the other endmost section 31 and seats upon the inlet wall 29.

It will now be seen that when the gates are closed, as in Fig. 5, each intermediate gate coacts with two adjacent closure sections 31 and with the side walls 32, to close the openings 38, the endmost opening being indicated at 41, and being disposed in end wall 33.

The gates 35 protrude through slots 34 and are secured to a gate operating bar 42, at points 43. It will be understood that a gate operating or connecting bar 42 will be disposed for connection with both ends of the gates 35. Gate bar 42 is connected with gate shifting rods 44, at 45, and brace rods 46 are provided to reinforce the connection and to hold the rods 44 at right angles to bar 42. Rods 44 are held to a linear movement by devices, one of which is shown in detail, in Fig. 6.

To the side wall 32 of the supply bucket 28 is fixed a bearing stud 47, against which rod 44 is arranged to engage. A guiding retainer and brake 48 not only engages said rod 44 and coacts with bearing lugs 47 to hold the rod 44 to a linear movement, but it also engages rod 44 with sufficient pressure to prevent free and unrestrained movement of the latter, and preferably, to prevent any movement of rod 44 other than that which is positively imparted thereto. Brake 48 is mounted upon a lever 49 which is pivoted at 50, to the side wall 32, at one end of said lever. The remaining end of said lever is apertured for projection therethrough of a bolt 51 which is mounted upon side wall 32, as indicated at 52. Between lever 49 and a nut 53, is interposed a spring 54 which imparts the necessary pressure engagement for braking purposes, as just described. A device similar to the foregoing, is provided for each operating rod 44.

It will be noted by reference to Fig. 5, that the slots 34 will be partially open irrespective of the position of the gates 35. I therefore provide means for closing the slots when the gate valves are in the position shown in Fig. 5.

As will be seen by reference to Fig. 7, the side wall 32 is provided with guides 55 in which a sliding closure 56, is guided, the bottom of the closure resting upon gate valve 35. As valve 35 rises, it will elevate the sliding closure 56, and as the gate valve 35 descends, the sliding closure 56 will descend by gravity. The closure 56 is of such length as to always extend over and close the slots 34 when the latter are opened.

My improved motor bucket, indicated at 57, is provided with an inclined wall 58 adapted to nest against wall 29 and by reference to Fig. 2, it will be seen that the lateral dimension of the motor bucket is considerably in excess of the transverse dimension of the filling bucket. The back wall 59, of the motor bucket, will fit relatively closely against back wall 33 when the buckets are nested. The motor bucket 57 is provided with gate seat sections 60, arranged similar to sections 31, and gate valves 61, arranged similar to gate valves 35. End gate valves 62 and 63 are also arranged similar to end gate valves 39 and 40. By reference to Fig. 5, it will be seen that the gate valves of the motor bucket will interlap the gate valves of the filling bucket when the buckets are in nested transferring relation so that the valve passage openings 64 will be disposed in practical registry with valve passage openings 38.

On the inside faces of uprights 6, as will be seen more particularly in Fig. 8, guides 65 are mounted between which a roller 66 on the side wall 67, of motor bucket 57, runs. Motor bucket 57 is connected by rods 68 with crank disks 17 and 18, the intermediate connecting rods 68 being mounted upon cranks 20, 21, 24 and 26. Rods 68 are connected at 69, with an attachment 70, the latter being fixed to the movable bucket 57. The gates 61 of the motor bucket are connected by a gate bar 71, in a manner similar to the connection of gates 35 with bar 42. Bar 71 is connected with operating rods 72 which are held vertical by braking devices 73, in all respects similar to the braking device shown in Fig. 6. The upper ends of the operating rods 72 are slidable in guides 74, mounted upon the frame work, and the rods 72 are provided with actuating buffers or stops for engagement with said guides. As shown more particularly in Fig. 3, rods 72 are provided with a lower buffer comprising a collar 75 and a spring 76, and an upper buffer comprising a collar 77 and a spring 78. Now as the motor bucket rises, the lower buffer 75 will engage guides 74 when the motor bucket substantially reaches an upper receiving position so as to depress the gates 61 and close the latter. On descent of the motor bucket, the upper buffer 77 will engage guide 74 and the gates will be elevated or opened.

I will next describe the means whereby the gates of the supply bucket are controlled by movement of the motor bucket. The motor bucket is provided with supply valve actuating means in the form of rods 79 having stop arms 80. On the rods 44 I provide upper and lower stop buffers similar in construction to those provided for rods 72, comprising collars 81 and 82 and springs 83 and 84. Now as the motor bucket descends, arms 80 will engage the lower stops and cause descent of rods 44 to close supply gates 35. When the motor bucket ascends, stop arms 80 will engage the upper stops and elevate or open the supply gates 35 at such time as the motor bucket is nested in receiving relation with the supply bucket. It will therefore be seen that devices are provided which are actuated upon movement of the motor bucket to operate the valves of the motor bucket and the supply bucket, and further, that these devices are spring actuated so that opening and closing movements will be quickly imparted to the valves. This quick opening and closing movement of the valves is also due to the brake devices which normally act to resist longitudinal movement of the rods 44 and 72 and therefor the springs of the buffers will be placed under considerable tension before they will actuate the gates but when they do actuate them, such actuation will result from recoil of the springs and therefore a very sudden opening and closing movement will be imparted.

Gates 85 are provided, one for each supply bucket, for controlling ingress thereto through inlet 30. Each gate 85 is guided by means indicated at 86 and is provided with a rack 87. A shaft 88 is mounted in suitable bearings 89 and is provided with gear wheels 90, for operating the racks of said gates. A hand wheel 91 is provided for operating the shaft 88.

It is believed that the advantages and utility of my invention will be clearly understood from the foregoing description and while I have herein shown and described one specific form of my invention, I do not wish to be limited thereto except for such limitations as the claims may import.

I claim:—

1. In a water motor, a supply bucket provided with a discharge valve, braking means normally resisting movement of said discharge valve, a motor bucket movable into receiving relation with said supply bucket, and spring means operated by said motor bucket for effecting quick actuation of said discharge valve, substantially as described.

2. In a water motor, a supply bucket provided with a discharge valve, braking means normally resisting movement of said discharge valve, a motor bucket movable into receiving relation with said supply bucket, and means operated by said motor bucket for effecting quick actuation of said discharge valve, substantially as described.

3. In a water motor, a supply bucket provided with a discharge valve, braking means normally resisting movement of said discharge valve, a motor bucket movable into receiving relation with said supply bucket, an actuating rod mounted upon said motor bucket, and oppositely disposed spring buffers connected with said discharge valve and coacting with said rod for opening and closing said discharge valve on movement of said motor bucket, substantially as described.

4. In a water motor, a motor bucket provided with a discharge valve, means for supplying water to said motor bucket to actuate the latter, a rod connected with said discharge valve, braking means for resisting movement of said rod, a guide for said rod, and spring buffers mounted on said rod for coaction with said guide to open and close said discharge valve upon movement of said motor bucket, substantially as described.

5. In a water motor, a bucket provided with a discharge valve and having a slotted guide for said valve, and a gravity acting closure for closing said slotted guide when said valve is in one position, substantially as described.

6. In a water motor, a bucket provided with a discharge valve and having a slotted guide for said valve, and a closure actuated by said valve and normally acting to close said slotted guide, substantially as described.

7. In a water motor, a bucket provided with a discharge valve, a rod connected with said valve, a braking lever pivoted to said bucket and engaging said rod, a spring for maintaining braking engagement, and means coacting with said rod to operate said valve, substantially as described.

8. In a water motor, a supply bucket having vertically movable gate valves, and a bottom wall for said bucket comprising valve seat sections inclined with respect to said gate valves and opposite portions of said sections coacting with adjacent gate valves to close the bottom of said bucket when said gate valves are in a closed position, substantially as described.

9. In a water motor, a bucket provided with vertically movable gate valves, said bucket having a bottom wall formed of valve seat sections inclined with respect to the horizontal, the upper portion of each section fitting abreast of a lateral face of one gate valve and the opposite lower portion of such section extending beneath and forming a seat for the next adjacent gate valve, substantially as described.

10. In a water motor, a supply bucket having downwardly facing valve means, and a motor bucket shaped to nest in receiving relation with said supply bucket and having a valve structure interlapping with the valve structure of said supply bucket, substantially as described.

In testimony whereof I affix my signature.

GUSTAVE A. WENDT.

Copies of this patent may be obtained for five cents each, by addressing the "Commissioner of Patents, Washington, D. C."